(12) United States Patent
Fujita

(10) Patent No.: US 10,870,346 B2
(45) Date of Patent: Dec. 22, 2020

(54) SHIFT LEVER MOUNTING BRACKET AND SHIFT LEVER DEVICE

(71) Applicant: ALPS ALPINE CO., LTD., Tokyo (JP)

(72) Inventor: Masanori Fujita, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 111 days.

(21) Appl. No.: 16/378,957

(22) Filed: Apr. 9, 2019

(65) Prior Publication Data

US 2019/0232784 A1   Aug. 1, 2019

Related U.S. Application Data

(63) Continuation of application No. PCT/JP2017/039382, filed on Oct. 31, 2017.

(30) Foreign Application Priority Data

Nov. 28, 2016   (JP) ................. 2016-230024

(51) Int. Cl.
  *B60K 20/02* (2006.01)
  *B60K 20/08* (2006.01)
  *F16H 59/10* (2006.01)

(52) U.S. Cl.
  CPC .............. *B60K 20/02* (2013.01); *B60K 20/08* (2013.01); *F16H 59/10* (2013.01)

(58) Field of Classification Search
  CPC ........ B60K 20/02; B60K 20/08; B60K 20/04; F16H 59/10; F16H 61/0003
  See application file for complete search history.

(56) References Cited

U.S. PATENT DOCUMENTS 4,245,521 A * 1/1981 Osborn .................. B60K 20/02
                                                 74/473.15
4,565,107 A   1/1986 Muller
(Continued)

FOREIGN PATENT DOCUMENTS

CN          105774541         7/2016
EP            0860630         8/1998
(Continued)

OTHER PUBLICATIONS

International Search Report dated Jan. 30, 2018, for PCT/JP2017/039382 filed on Oct. 31, 2017 with English translation.
(Continued)

*Primary Examiner* — Zakaria Elahmadi
(74) *Attorney, Agent, or Firm* — IPUSA, PLLC

(57) ABSTRACT

A shift lever mounting bracket includes a vehicle-side fixing plate having a virtually flat shape; a lever-side fixing plate having a virtually flat shape; a connecting plate having a virtually flat shape, and extending virtually parallel to both a direction orthogonal to the vehicle-side fixing plate and a direction orthogonal to the lever-side fixing plate; a vehicle-side bend part connecting a part of an edge of the vehicle-side fixing plate with a part of an edge of the connecting plate; and a lever-side bend part connecting a part of an edge of the lever-side fixing plate and a part of the edge of the connecting plate. The entirety of the shift lever mounting bracket is constituted with a continuous flat plate.

6 Claims, 12 Drawing Sheets

(56) References Cited

U.S. PATENT DOCUMENTS

| | | | | |
|---|---|---|---|---|
| 5,249,478 A | * | 10/1993 | Moroto | F16H 59/0204 74/473.18 |
| 5,593,011 A | * | 1/1997 | Harada | F16H 59/10 192/220.4 |
| 5,749,268 A | * | 5/1998 | Nishimura | F16H 59/044 74/471 XY |
| 5,768,944 A | * | 6/1998 | Inuzuka | F16H 59/0204 74/335 |
| 2004/0000209 A1 | * | 1/2004 | Nagasawa | F16H 59/10 74/473.3 |
| 2004/0237691 A1 | | 12/2004 | Matsutani | |
| 2014/0345410 A1 | * | 11/2014 | Yamamoto | F16H 61/24 74/473.3 |
| 2016/0069454 A1 | * | 3/2016 | Lan | F16H 59/10 74/473.21 |
| 2020/0079213 A1 | * | 3/2020 | Yamamura | B60K 20/02 |

FOREIGN PATENT DOCUMENTS

| | | |
|---|---|---|
| EP | 2009326 | 12/2008 |
| GB | 1468734 | 3/1977 |
| JP | S60-135926 U | 9/1985 |
| JP | H06-257668 | 9/1994 |
| JP | H07-285354 | 10/1995 |
| JP | H11-314532 | 11/1999 |
| JP | 2004-276713 | 10/2004 |
| JP | 2009-006906 | 1/2009 |

OTHER PUBLICATIONS

Extended European Search Report for EP17873184.0 dated Jun. 24, 2020.

* cited by examiner

SHIFT LEVER MOUNTING BRACKET AND SHIFT LEVER DEVICE

CROSS-REFERENCE TO RELATED APPLICATION

This application is a continuation application of International Application No. PCT/JP2017/039382 filed on Oct. 31, 2017, and designated the U.S., which is based upon and claims the benefit of priority of the prior Japanese Patent Application No. 2016-230024, filed on Nov. 28, 2016, the entire contents of which are incorporated herein by reference.

BACKGROUND OF THE INVENTION

1. Field of the Invention

The present disclosure relates to a shift lever mounting bracket and a shift lever device.

2. Description of the Related Art

As described in Japanese Laid-Open Patent Publication No. H6-257668 (Patent Document 1, below), a shift lever device that switches transmission of a vehicle is fixed to the vehicle by using a bracket. The bracket is rigidly fixed between the housing of the shift lever device and the vehicle. When the operator tilts the shift lever rotatably supported by the housing, the transmission of the vehicle is switched.

However, when the operator tilts the shift lever, a load in the operating direction is imposed on the bracket through the housing. A bracket described in Patent Document 1 has a cylindrical container shape that has a circular opening on one side fixed to the vehicle, and has a disk-shaped bottom where the shift lever device is fixed. In other words, as having such a cylindrical container shape, the bracket described in Patent Document 1 has a disadvantage that processing is difficult. In addition, conventionally, the bracket is generally formed of a thick metal plate to withstand the load, which brings other disadvantages that the weight of the bracket increases and that the cost becomes high.

SUMMARY OF THE INVENTION

Accordingly, it is an object in one aspect of the embodiments to provide an object to provide a shift lever mounting bracket that is easy to process, light, and has a high strength, and a shift lever device including the shift lever mounting bracket.

According to an embodiment, a shift lever mounting bracket includes a vehicle-side fixing plate having a virtually flat shape; a lever-side fixing plate having a virtually flat shape; a connecting plate having a virtually flat shape, and extending virtually parallel to both a direction orthogonal to the vehicle-side fixing plate and a direction orthogonal to the lever-side fixing plate; a vehicle-side bend part connecting a part of an edge of the vehicle-side fixing plate with a part of an edge of the connecting plate; and a lever-side bend part connecting a part of an edge of the lever-side fixing plate and a part of the edge of the connecting plate. The entirety of the shift lever mounting bracket is constituted with a continuous flat plate.

According to this configuration, since the connecting plate extends virtually in parallel to both of the direction orthogonal to the vehicle-side fixing plate and the direction orthogonal to the lever-side fixing plate, the connecting plate can withstand a greater force than in other cases even if being thinner. In particular, since both of the force orthogonal to the vehicle-side fixing plate and the force orthogonal to the lever-side fixing plate are applied along the connecting plate, the connecting plate can withstand a greater force compared with the case where a force is applied to the connecting plate obliquely. Also, since the entire connecting plate is constituted with by a single continuous flat plate, processing is easy. In other words, it is possible to obtain the shift lever mounting bracket that is easy to process, light, and has a high strength.

Preferably, in the shift lever mounting bracket in the present disclosure, the direction orthogonal to the vehicle-side fixing plate and the direction orthogonal to the lever-side fixing plate cross each other.

According to this configuration, since the direction orthogonal to the vehicle-side fixing plate and the direction orthogonal to the lever-side fixing plate cross each other, the force orthogonal to the vehicle-side fixing plate and the force orthogonal to the lever-side fixing plate are not directed in the same direction, and thereby, the connecting plate is not easily deformed. Also, even if a force along the lever-side fixing plate is applied to the lever-side fixing plate, since it is not likely to act as a force to widen the angle between the connecting plate and the vehicle-side fixing plate, it is possible to withstand a greater force compared with a parallel case.

Preferably, in the shift lever mounting bracket in the present disclosure, the vehicle-side fixing plate and the lever-side fixing plate extend along a virtually orthogonal plane.

According to this configuration, since the vehicle-side fixing plate and the lever-side fixing plate are virtually orthogonal to each other, the force orthogonal to the vehicle-side fixing plate and the force orthogonal to the lever-side fixing plate are virtually orthogonal to each other, and thereby, the connecting plate in particular is not easily deformed. Also, even if a force along the lever-side fixing plate is applied to the lever-side fixing plate, since it is not likely to act as a force to widen the angle between the connecting plate and the vehicle-side fixing plate, it is possible to withstand a greater force compared with a parallel case.

Preferably, the shift lever mounting bracket according to an embodiment further includes a plurality of support parts; and one or more connecting parts connecting the plurality of support parts, wherein each of the plurality of support parts includes one instance of the vehicle-side fixing plate, one instance of the lever-side fixing plate, and one instance of the connecting plate, and wherein each of the one or more connecting parts connects two instances of the lever-side fixing plates included in two instances of the support parts.

According to this configuration, since one or more connecting parts are provided to connect multiple support parts with multiple support parts, the shift lever can be fixed more firmly than in the case where only one support part is provided.

Preferably, the shift lever mounting bracket according to an embodiment further includes a plurality of connecting bend parts, wherein the connecting part includes a plurality of connecting plates, wherein a part of the edge of the vehicle-side fixing plate and a part of the edge of the connecting plate are connected by one of the plurality of connecting bend parts, wherein a part of the edge of the connecting plate and a part of the edge of the connecting plate are connected by one of the plurality of connecting bend parts, and wherein two of connecting plates connected by said each of the connecting bend parts are virtually orthogonal to each other.

According to this configuration, since the two connecting plates connected by the respective connecting bend parts are virtually orthogonal to each other, it is possible to withstand a greater force than in the case where these are not orthogonal to each other, even if being thinner.

Preferably, the shift lever mounting bracket according to an embodiment further includes a first support part as the support part; and a second support part as the support part, wherein the first support part and the second support part are separated from each other in the first direction, wherein the vehicle-side fixing plate of the first support part and the vehicle-side fixing plate of the second support part are virtually parallel along the first direction, wherein the lever-side fixing plate of the first support part and the lever-side fixing plate of the second support part are virtually parallel to each other, wherein the connecting part includes a first connecting plate as the connecting plate virtually parallel to the vehicle-side fixing plate of the first support part, a second connecting plate as the connecting plate virtually parallel to the lever-side fixing plate of the first support part, and a third connecting plate as the connecting plate parallel to the lever-side fixing plate of the second support part in a virtually orthogonal direction, wherein the vehicle-side fixing plate of the first support part and the first connecting plate are connected by one of the plurality of connecting bend parts, wherein the first connecting plate and the second connecting plate are connected by one of the plurality of connecting bend parts over a range linearly extending in the first direction, wherein the second connecting plate and the third connecting plate are connected by one of the plurality of connecting bend parts, and wherein the third connecting plate and the vehicle-side fixing plate of the second support part are connected by one of the plurality of connecting bend parts.

According to this configuration, the first support part and the second support part are separated in the first direction, and at the connecting part that connects the first support part with the second support part, the first connecting plate and the second connecting plate are connected by one of the connecting bend parts over a range linearly extending in the first direction; therefore, it is possible to withstand a large force applied in the first direction as compared to the other directions. Also, since the vehicle-side fixing plate of the first support part and the first connecting plate are virtually parallel, the lever-side fixing plate of the first support part and the first connecting plate are virtually orthogonal to each other, and it is possible to withstand a strong force. Also, since the lever-side fixing plate of the second support part and the third connecting plate are virtually orthogonal to each other, it is possible to withstand a strong force.

Preferably, the shift lever mounting bracket in the present disclosure is made of metal.

According to this configuration, since it is made of metal, the strength is higher than that made of a resin or the like.

According to an embodiment, a shift lever device includes a shift lever configured to receive an operation performed by an operator so as to switch a transmission of a vehicle according to a movement of the shift lever; a support part; and the shift lever mounting bracket described above, wherein the support member is fixed to the lever-side fixing plate.

According to this configuration, the support member can be stably fixed to the vehicle by the shift lever mounting bracket that is easy to process, light, and has a high strength.

Preferably, the shift lever device according to an embodiment further includes a target member having a mounting surface virtually perpendicular to the ground, wherein the vehicle-side fixing plate is attached to the mounting surface.

According to this configuration, since the vehicle-side fixing plate is attached to the attachment surface virtually perpendicular to the ground, the shift lever mounting bracket can be mounted in the lateral direction with respect to the target member, and the space in the vehicle can be efficiently used as compared with the case of mounting it on the ground side surface in the vehicle.

According to an embodiment, it is possible to provide a shift lever mounting bracket that is easy to process, light, and has a high strength, and a shift lever device including the shift lever mounting bracket.

DESCRIPTION OF THE PREFERRED EMBODIMENTS (Overall Configuration)

Figure 1:
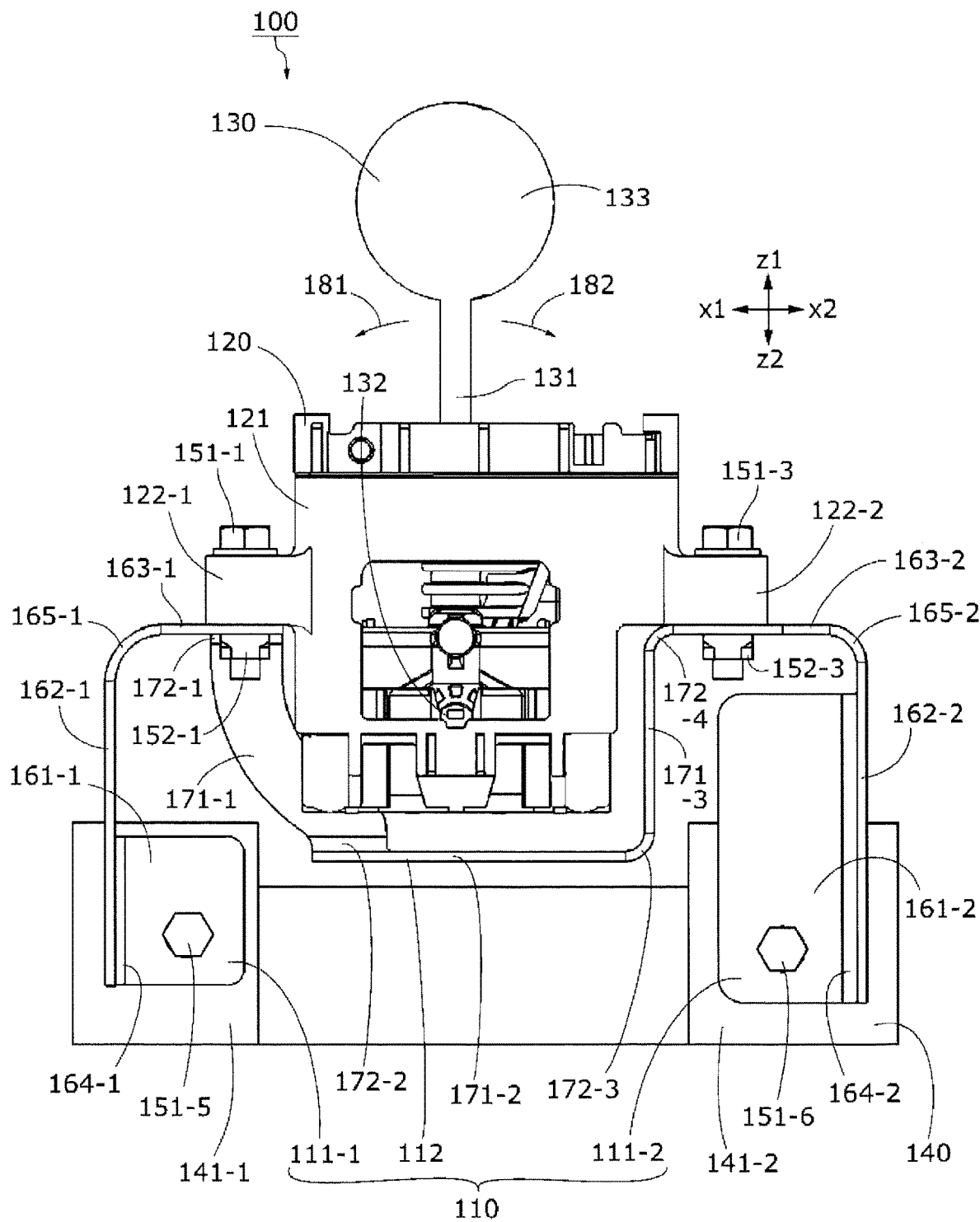
FIG. 1 is a front view of a shift lever device according to an embodiment in the present disclosure.
Figure 2:
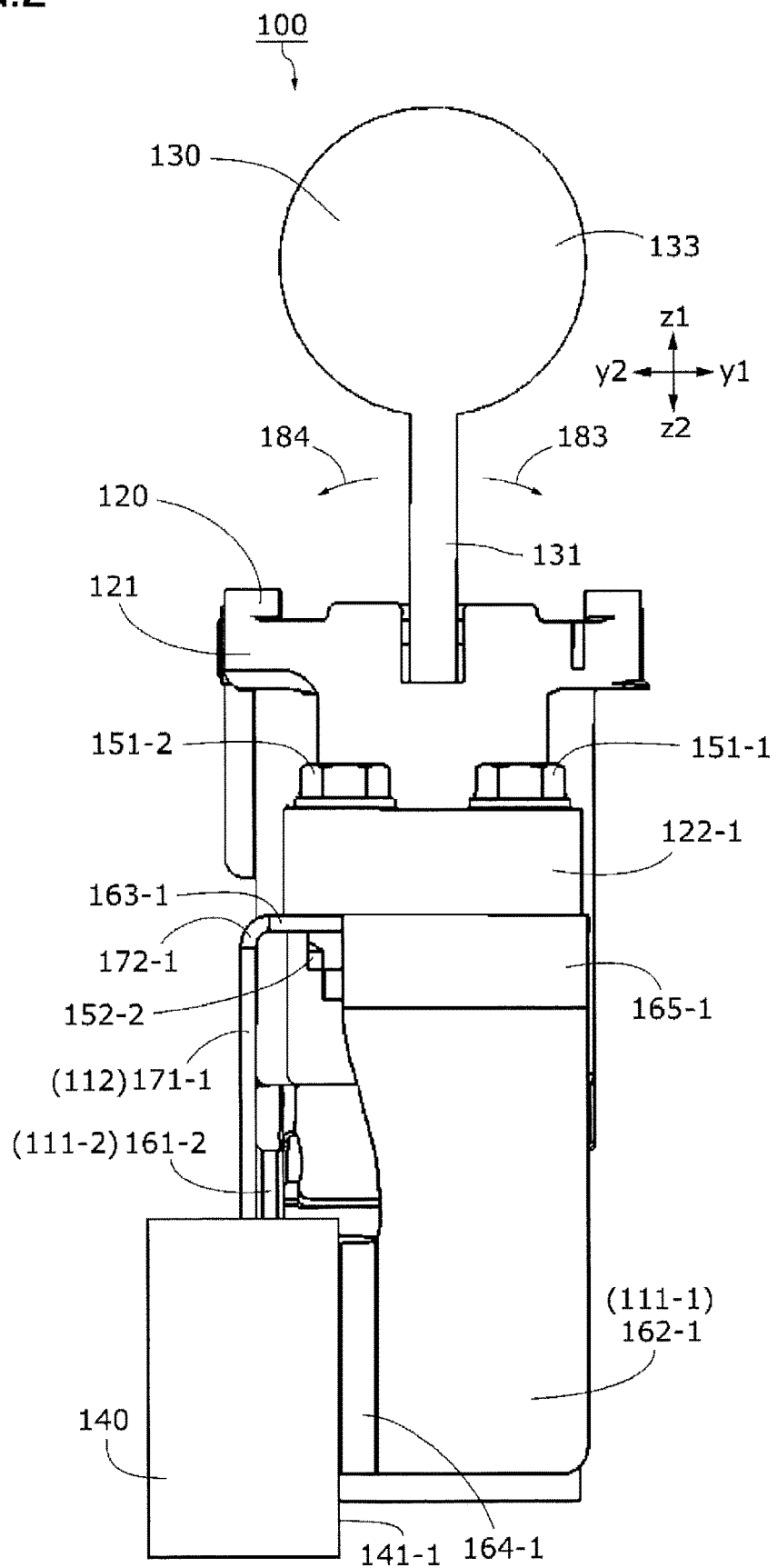
FIG. 2 is a left side view of the shift lever device illustrated in FIG. 1.
Figure 3:
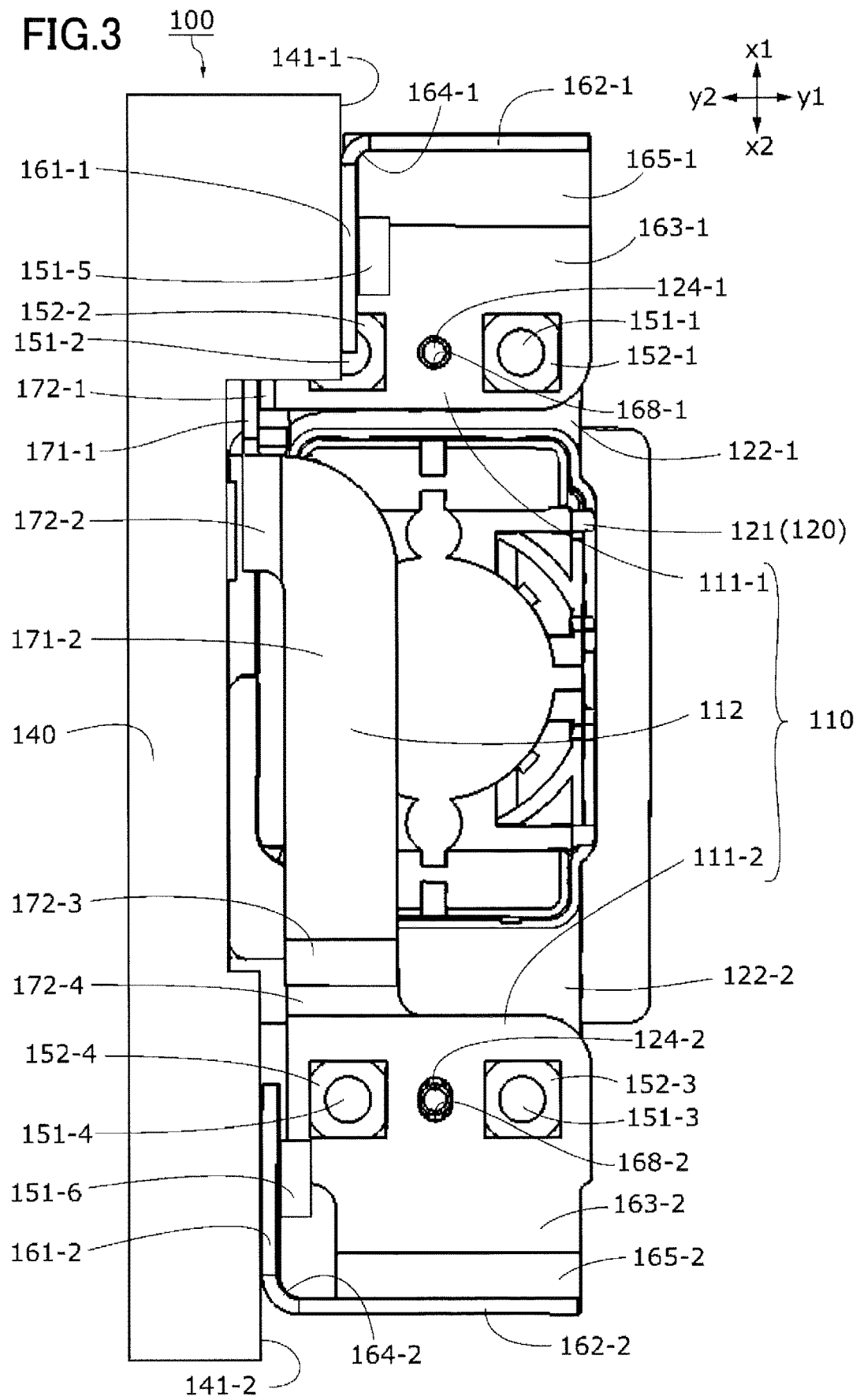
FIG. 3 is a bottom view of the shift lever device illustrated in FIG. 1.

In the following, a shift lever device according to an embodiment will be described. FIG. 1 is a front view of a shift lever device 100 of the present embodiment. FIG. 2 is a left side view of the shift lever device 100. FIG. 3 is a bottom view of the shift lever device 100. As illustrated in FIG. 1, the shift lever device 100 includes a shift lever mounting bracket 110 (may be referred to as a bracket 110, below), a support member 120, a shift lever 130, a target member 140, and a first bolt 151-1 to a sixth bolt 151-6, and a first nut 152-1 to a fourth nut 152-4.

The shift lever device 100 is mounted in the vicinity of the driver's seat of a vehicle, to switch the transmission of the vehicle (not illustrated) according to the movement of shift lever 130 receiving an operation performed by the operator. The bracket 110 is a member that fixes the support member 120 movably supporting the shift lever 130, to the vehicle.

Figure 4:
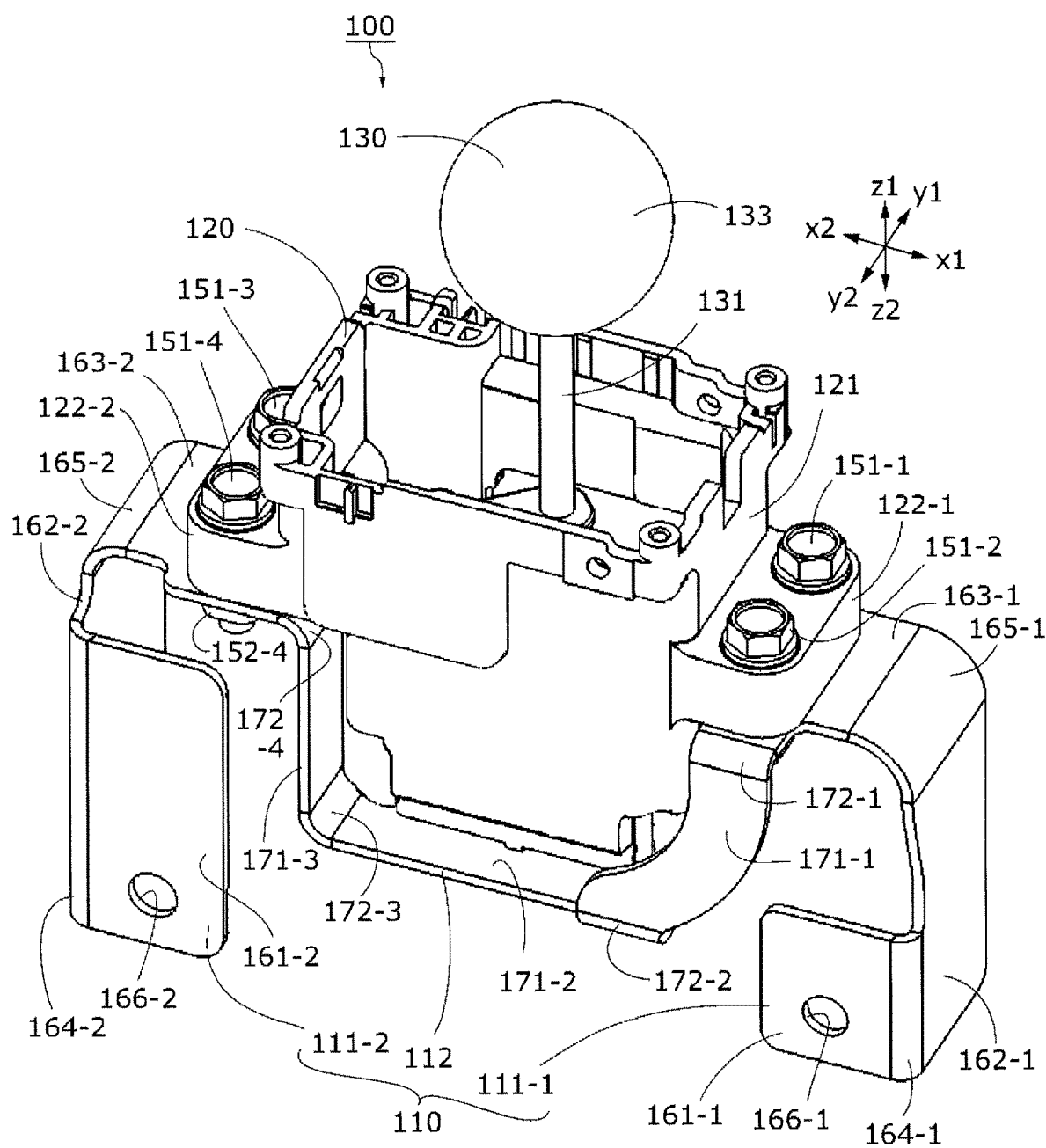
FIG. 4 is a perspective view of the shift lever device illustrated in FIG. 1 in which a fifth bolt, a sixth bolt, and a target member are omitted.
Figure 5:
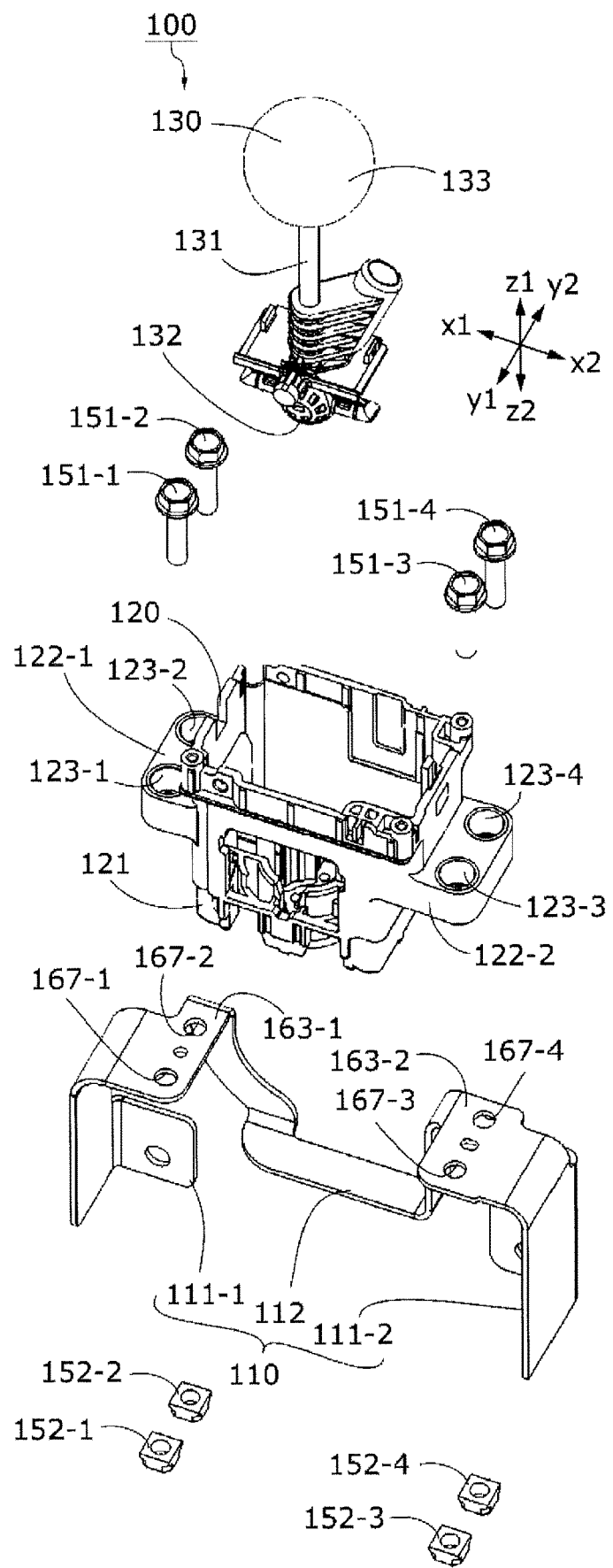
FIG. 5 is an exploded perspective view of the shift lever device illustrated in FIG. 1 in which the fifth bolt, the sixth bolt, and the target member are omitted.

FIG. 4 is a perspective view of the shift lever device 100 in which the fifth bolt 151-5 and the sixth bolt 151-6 and the target member 140 illustrated in FIG. 1 are omitted. FIG. 5 is an exploded perspective view of the shift lever device 100 in which the fifth bolt 151-5 and the sixth bolt 151-6 and the target member 140 illustrated in FIG. 1 are omitted.

In the present specification, x, y, and z directions are defined to be orthogonal to each other. The x direction represents x1 direction and x2 direction without distinguishing these two, which are opposite to each other. The y direction represents y1 direction and y2 direction without distinguishing these two, which are opposite to each other. The z direction represents z1 direction and z2 direction without distinguishing these two, which are opposite to each other. These directions are defined for the sake of convenience to describe a relative positional relationship, and do not limit the directions in actual use. The shape of an element is not limited to the exact geometric shape based on a described representation as long as the technical idea of an embodiment disclosed in the present specification can be realized, irrespective of "virtually" used in the description.

(Shift Lever Mounting Bracket)

Figure 6:
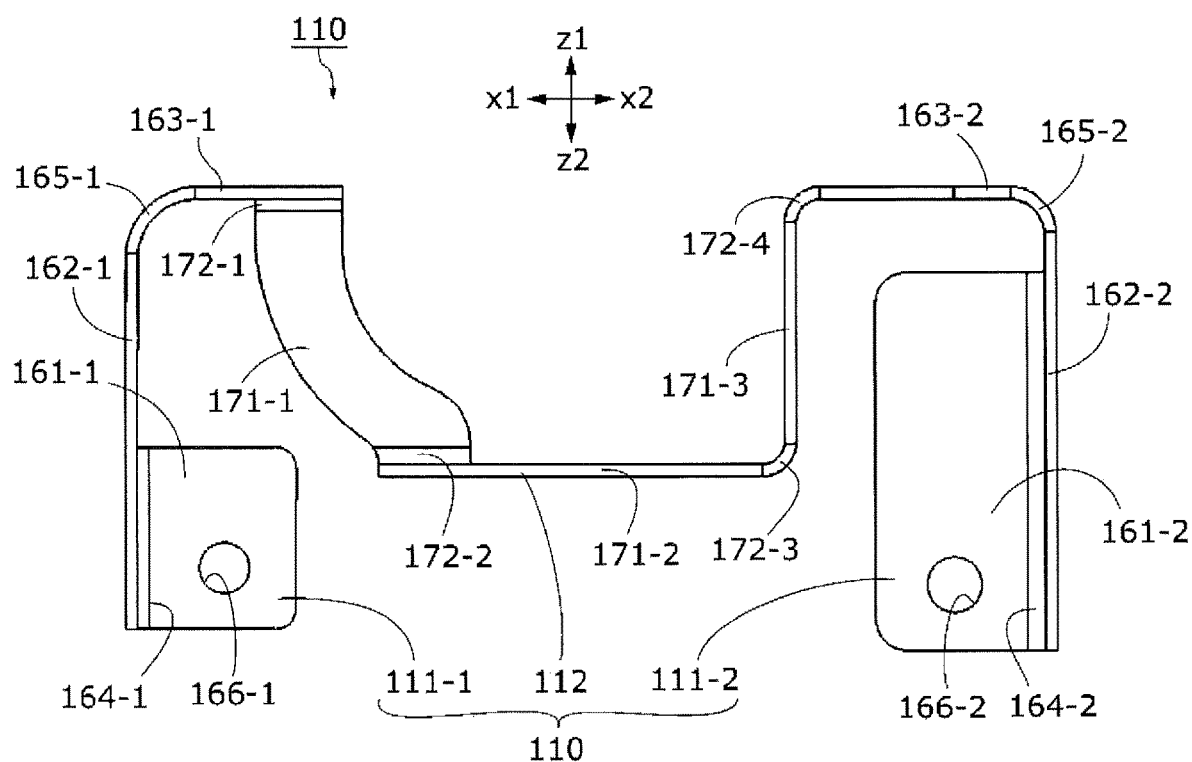
FIG. 6 is a front view of the bracket illustrated in FIG. 1.
Figure 7:
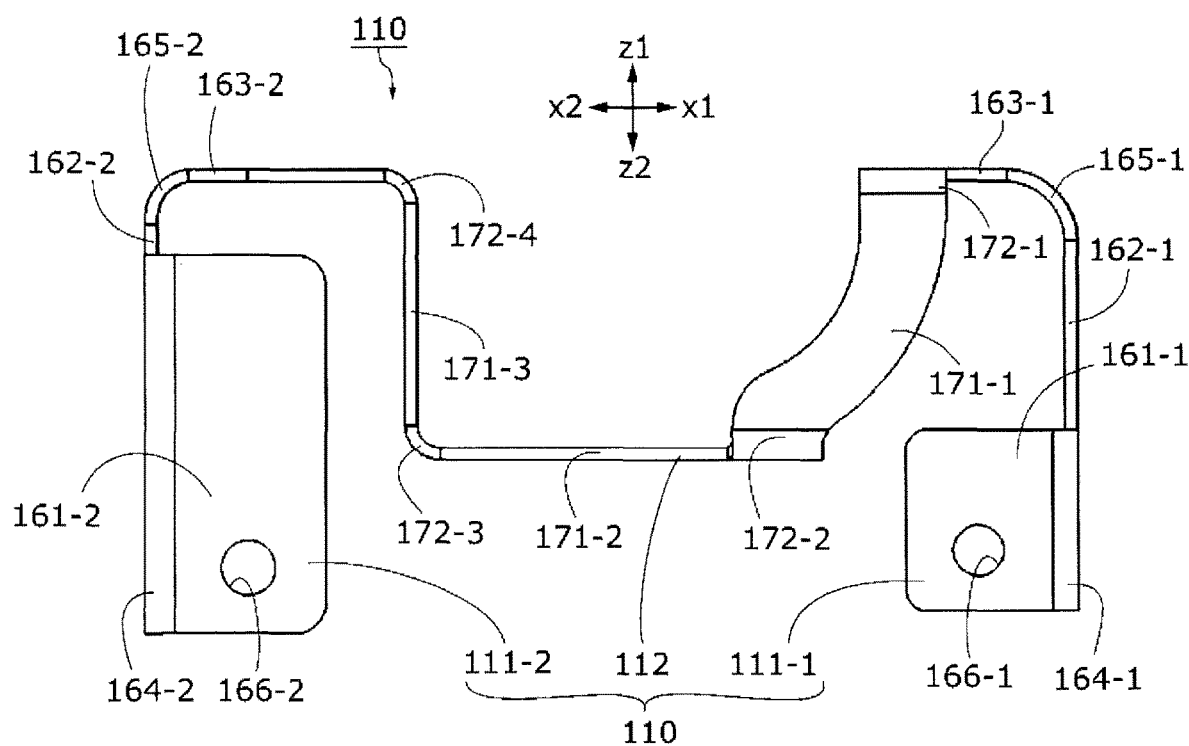
FIG. 7 is a rear view of the bracket illustrated in FIG. 6.
Figure 8:
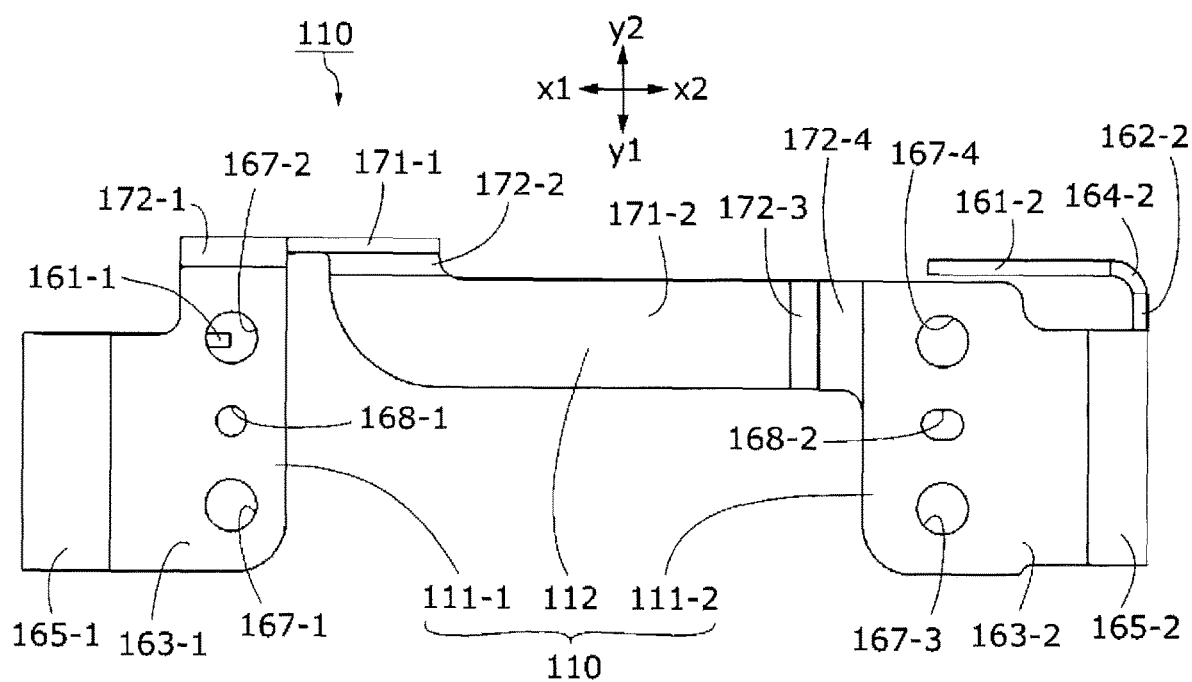
FIG. 8 is a plan view of the bracket illustrated in FIG. 6.
Figure 9:
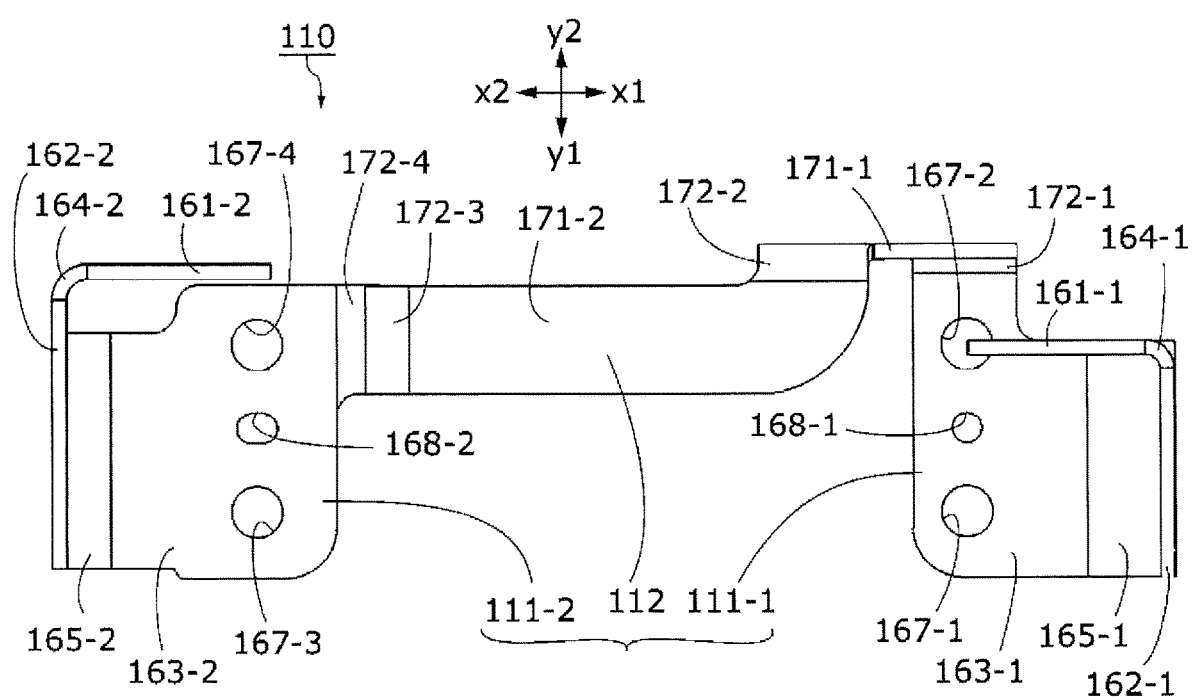
FIG. 9 is a bottom view of the bracket illustrated in FIG. 6.
Figure 10:
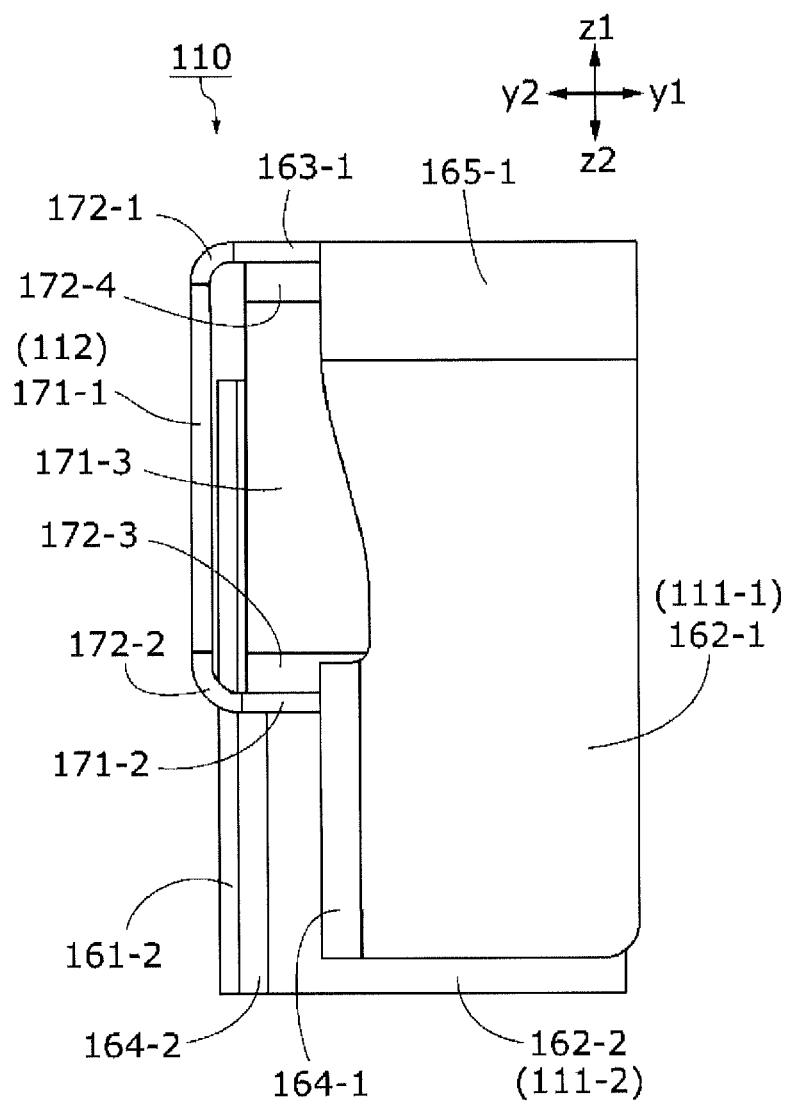
FIG. 10 is a left side view of the bracket illustrated in FIG. 6.
Figure 11:
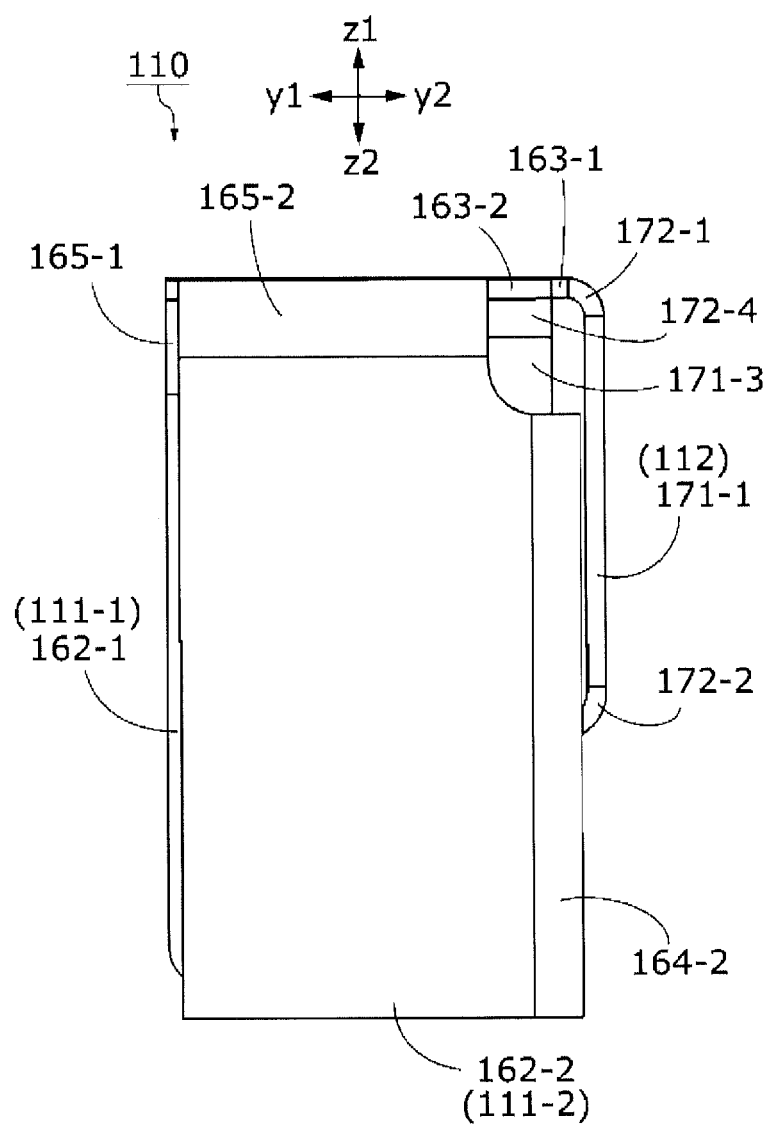
FIG. 11 is a right side view of the bracket illustrated in FIG. 6.
Figure 12:
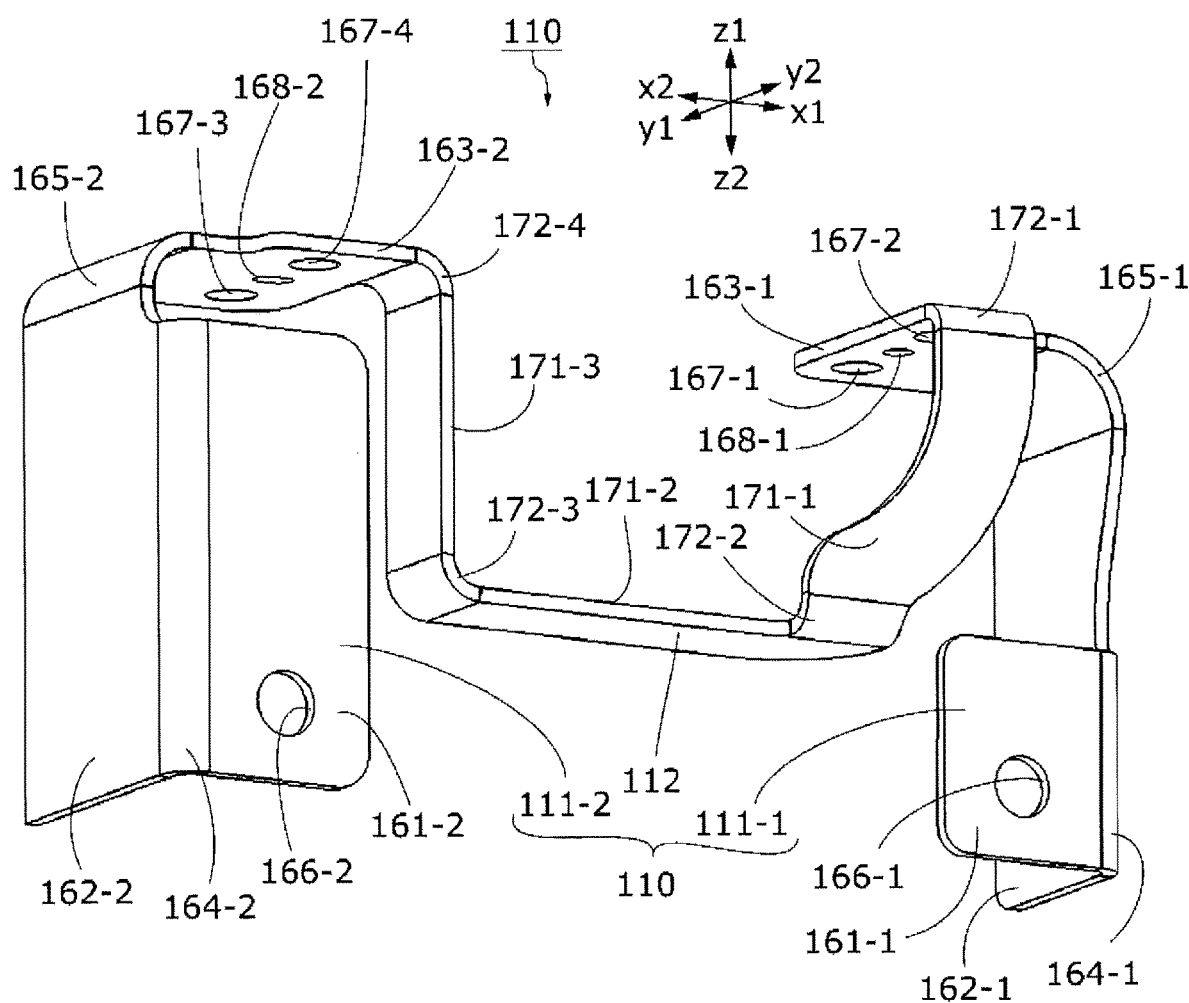
FIG. 12 is a perspective view of the bracket illustrated in FIG. 6.

FIG. 6 is a front view of the bracket 110. FIG. 7 is a rear view of the bracket 110. FIG. 8 is a plan view of the bracket 110. FIG. 9 is a bottom view of the bracket 110. FIG. 10 is a left side view of the bracket 110. FIG. 11 is a right side view of the bracket 110. FIG. 12 is a perspective view of the bracket 110.

The bracket 110 is constituted with a flat metal plate that is continuous as a whole, and is shaped by pressing the single metal plate, and then, bending the plate. The bracket 110 includes a first support part 111-1, a second support part 111-2 (also referred to as support part(s) 111 when the distinction is not required), and a connecting part 112.

(First Support Part of Bracket)

As illustrated in FIG. 6, the first support part 111-1 includes a first vehicle-side fixing plate 161-1, a first connecting plate 162-1, a first lever-side fixing plate 163-1, a first vehicle-side bend part 164-1, and a first lever-side bend part 165-1.

As illustrated in FIG. 6, the first vehicle-side fixing plate 161-1 has a virtually flat plate shape virtually parallel to the zx plane. As illustrated in FIG. 8, the first lever-side fixing plate 163-1 has a virtually flat plate shape virtually parallel to the xy plane. As illustrated in FIG. 10, the first connecting plate 162-1 has a virtually flat plate shape virtually parallel to the yz plane, and as illustrated in FIG. 12, is orthogonal to both of the first vehicle-side fixing plate 161-1 and the first lever-side fixing plate 163-1.

As illustrated in FIG. 7, the first vehicle-side fixing plate 161-1 is provided with a first vehicle-side fixing hole 166-1, which penetrates in the y direction. As illustrated in FIG. 8, the first lever-side fixing plate 163-1 is provided with a first lever-side fixing hole 167-1, a second lever-side fixing hole 167-2, and a first support hole 168-1, each of which penetrates in the z direction. The first lever-side fixing hole 167-1, the second lever-side fixing hole 167-2, and the first support hole 168-1 are linearly arranged in the y direction. The first support hole 168-1 is positioned between the first lever-side fixing hole 167-1 and the second lever-side fixing hole 167-2.

As illustrated in FIG. 4, the first vehicle-side bend part 164-1 connects the entire x1-side edge of the first vehicle-side fixing plate 161-1 with a part of the y2-side edge of the first connecting plate 162-1 over a range linearly extending in the z direction. In the z direction, the z2-side edge of the first vehicle-side fixing plate 161-1 and the z2-side edge of the first connecting plate 162-1 are at virtually the same position. The first connecting plate 162-1 extends in the z1 direction longer than the first vehicle-side fixing plate 161-1.

The first lever-side bend part 165-1 connects the entire z1-side edge of the first connecting plate 162-1 with the entire x1-side edge of the first lever-side fixing plate 163-1 over a range linearly extending in the y direction. In the y direction, the y1-side edge of the first connecting plate 162-1 and the y1-side edge of the first lever-side fixing plate 163-1 are at virtually the same position. The first lever-side fixing plate 163-1 extends in the y2 direction partially longer than the first connecting plate 162-1.

(Second Support Part of Bracket)

As illustrated in FIG. 6, the second support part 111-2 includes a second vehicle-side fixing plate 161-2, a second connecting plate 162-2, a second lever-side fixing plate 163-2, a second vehicle-side bend part 164-2, and a second lever-side bend part 165-2.

As illustrated in FIG. 6, the second vehicle-side fixing plate 161-2 has a virtually flat plate shape virtually parallel to the xz plane. As illustrated in FIG. 8, the second lever-side fixing plate 163-2 has a virtually flat plate shape virtually parallel to the xy plane. As illustrated in FIG. 11, the second connecting plate 162-2 has a virtually flat plate shape virtually parallel to the yz plane, and as illustrated in FIG. 12, is orthogonal to both of the second connecting plate 161-2 and the second lever-side fixing plate 163-2.

As illustrated in FIG. 7, the second vehicle-side fixing plate 161-2 is provided with a second vehicle-side fixing hole 166-2, which penetrates in the y direction. As illustrated in FIG. 8, the second lever-side fixing plate 163-2 is provided with a third lever-side fixing hole 167-3, a fourth lever-side fixing hole 167-4, and a second support hole 168-2, each of which penetrates in the z direction. The third lever-side fixing hole 167-3, the fourth lever-side fixing hole 167-4, and the second support hole 168-2 are linearly arranged in the y direction. The second support hole 168-2 is positioned between the third lever-side fixing hole 167-3 and the fourth lever-side fixing hole 167-4.

As illustrated in FIG. 12, the second vehicle-side bend part 164-2 connects the entire x2-side edge of the second vehicle-side fixing plate 161-2 with a part of the y2-side edge of the second connecting plate 162-2 over a range linearly extending in the z direction. In the z direction, the z2-side edge of the second vehicle-side fixing plate 161-2 and the z2-side edge of the second connecting plate 162-2 are at virtually the same position. The second connecting plate 162-2 extends in the z1 direction longer than the second vehicle-side fixing plate 161-2.

The second lever-side bend part 165-2 connects the entire z1-side edge of the second connecting plate 162-2 with the entire x2-side edge of the second lever-side fixing plate 163-2 over a range linearly extending in the y direction. In the y direction, the y1-side edge of the second connecting plate 162-2 and the y1-side edge of the second lever-side fixing plate 163-2 are at virtually the same position. The second lever-side fixing plate 163-2 extends in the y2 direction partially longer than the second connecting plate 162-2.

(First Support Part and Second Support Part of Bracket)

As illustrated in FIG. 9, the first support part 111-1 and the second support part 111-2 are separated in the x direction. The first support part 111-1 is positioned further on the x1 side than the second support part 111-2.

As illustrated in FIG. 9, the first vehicle-side fixing plate 161-1 and the second vehicle-side fixing plate 161-2 are virtually parallel along the x direction. The first vehicle-side fixing plate 161-1 is positioned further on the y1 side than the second vehicle-side fixing plate 161-2. As illustrated in FIG. 7, the z1-side edge of the first vehicle-side fixing plate 161-1 is positioned further on the z2 side than the z1-side edge of the second vehicle-side fixing plate 161-2. The z2-side edge of the first vehicle-side fixing plate 161-1 is positioned further on the z1 side than the z2-side edge of the second vehicle-side fixing plate 161-2. In other words, in the z direction, the first vehicle-side fixing plate 161-1 is shorter than the second vehicle-side fixing plate 161-2.

As illustrated in FIG. 6, the first lever-side fixing plate 163-1 and the second lever-side fixing plate 163-2 are virtually parallel along virtually the same plane. As illustrated in FIG. 9, in the y direction, the y1-side edge of the first lever-side fixing plate 163-1 is positioned further on the y2 side than the first vehicle-side fixing plate 161-1 and both of the second vehicle-side fixing plate 161-2 and the second lever-side fixing plate 163-2. In the y direction, the y2-side edge of the second lever-side fixing plate 163-2 is positioned between the first vehicle-side fixing plate 161-1 and the second vehicle-side fixing plate 161-2. As illustrated in FIG. 6, the x2-side edge of the first lever-side fixing plate 163-1 is positioned further on the x2 side than the first vehicle-side fixing plate 161-1. The x1-side edge of the second lever-side fixing plate 163-2 is positioned further on the x1 side than the second vehicle-side fixing plate 161-2.

In the following, the first vehicle-side fixing plate 161-1 and the second vehicle-side fixing plate 161-2 may be referred to as the vehicle-side fixing plate(s) 161 when the distinction is not required. The first lever-side fixing plate 163-1 and the second lever-side fixing plate 163-2 may be referred to as the lever-side fixing plate(s) 163 when the distinction is not required. The first connecting plate 162-1 and the second connecting plate 162-2 may be referred to as the connecting plate(s) 162 when the distinction is not required. The first vehicle-side bend part 164-1 and the second vehicle-side bend part 164-2 may be referred to as the vehicle-side bend part(s) 164 when the distinction is not required. The first lever-side bend part 165-1 and the second lever-side bend part 165-2 may be referred to as the lever-side bend part(s) 165 when the distinction is not required.

(Connecting Part of Bracket)

The connecting part 112 includes a first connecting plate 171-1 to a third connecting plate 171-3 (may be referred to as a connecting plate(s) 171 when the distinction is not required, below), and further includes a first connecting bend part 172-1 to a fourth connecting bend part 172-4 (may be referred to as a connecting bend part(s) 172 when the distinction is not required).

As illustrated in FIG. 7, the first connecting plate 171-1 is a virtually flat plate virtually parallel to the zx plane, and virtually parallel to the first vehicle-side fixing plate 161-1. As illustrated in FIG. 9, the second connecting plate 171-2 is a virtually flat plate virtually parallel to the xy plane, and virtually parallel to the first lever-side fixing plate 163-1. As illustrated in FIG. 12, the third connecting plate 171-3 is a virtually flat plate virtually parallel to the yz plane, and is virtually orthogonal to the second lever-side fixing plate 163-2.

As illustrated in FIG. 12, the first connecting bend part 172-1 connects a part of the y2-side edge of the first lever-side fixing plate 163-1 with the entire y2-side edge of the first connecting plate 171-1 over a range linearly extending in the x direction. The second connecting bend part 172-2 connects the entire z2-side edge of the first connecting plate 171-1 with a part of the y2-side edge of the second connecting plate 171-2 over a range linearly extending in the x direction. The third connecting bend part 172-3 connects the entire x2-side edge of the second connecting plate 171-2 with the entire z2-side edge of the third connecting plate 171-3 over a range linearly extending in the y direction. The fourth connecting bend part 172-4 connects the entire z1-side edge of the third connecting plate 171-3 with a part of the x1-side edge of the second lever-side fixing plate 163-2 over a range linearly extending in the y direction. The first connecting plate 171-1, the second connecting plate 171-2, and the third connecting plate 171-3 are virtually orthogonal to each other.

As illustrated in FIG. 7, in the z direction, the second connecting bend part 172-2 is positioned further on the z2 side than the first connecting bend part 172-1; and in the x direction, the second connecting bend part 172-2 is positioned further on the x2 side than the first connecting bend part 172-1. The first connecting plate 171-1 is gradually shifted in the x2 direction while extending from the first connecting bend part 172-1 in the z2 direction. As illustrated in FIG. 9, in the x direction, the third connecting bend part 172-3 is positioned further on the x2 side than the second connecting bend part 172-2. The second connecting plate 171-2 extends in the x direction along a virtually linear path. As illustrated in FIG. 12, in the z direction, the fourth connecting bend part 172-4 is positioned further on the z1 side than the third connecting bend part 172-3. The third connecting plate 171-3 extends in the z direction along a virtually linear path.

(Support Member)

As illustrated in FIG. 5, the support member 120 includes a virtually rectangular case 121, a first protruding part 122-1 extending in the x1 direction from the x1 side of the case 121, and a second protruding part 122-2 extending in the x2 direction from the x2 side of the case 121.

The first protruding part 122-1 is provided with a first through hole 123-1 and a second through hole 123-2, each of which penetrates in the z direction. The first through holes 123-1 and the second through holes 123-2 are arranged in the y direction. The second protruding part 122-2 is provided with a third through hole 123-3 and a fourth through hole 123-4, each of which penetrates in the z direction. The third through holes 123-3 and the fourth through holes 123-4 are arranged in the y direction.

As illustrated in FIG. 1, the planar surface on the z2 side of the first protruding part 122-1 closely contacts the planar surface on the z1-side of the first lever-side fixing plate 163-1. The first bolt 151-1 illustrated in FIG. 5 goes through the first through hole 123-1 and the first lever-side fixing hole 167-1 from the z1-side, to be fixed by the first nut 152-1 positioned on the z2 side of the first lever-side fixing plate 163-1 as illustrated in FIG. 3. The second bolt 151-2 illustrated in FIG. 5 goes through the second through hole 123-2 and the second lever-side fixing hole 167-2 from the z1-side, to be fixed by the second nut 152-2 positioned on the z2 side of the first lever-side fixing plate 163-1 as illustrated in FIG. 3.

As illustrated in FIG. 1, the planar surface on the z2 side of the second protruding part 122-2 closely contacts the planar surface on the z1-side of the second lever-side fixing plate 163-2. The third bolt 151-3 illustrated in FIG. 5 goes through the third through hole 123-3 and the third lever-side fixing hole 167-3, to be fixed by the third nut 152-3 positioned on the z2 side of the second lever-side fixing plate 163-2 as illustrated in FIG. 3. The fourth bolt 151-4 illustrated in FIG. 5 goes through the fourth through hole 123-4 and the fourth lever-side fixing hole 167-4, to be fixed by the fourth nut 152-4 positioned on the z2 side of the second lever-side fixing plate 163-2 as illustrated in FIG. 3. In other words, the support member 120 is fixed to the two lever-side fixing plates 163.

As illustrated in FIG. 3, a first supporting protrusion 124-1 protruding in the z2 direction from the z2-side surface of the first protruding part 122-1 is positioned within the first support hole 168-1. A second supporting protrusion 124-2 protruding in the z2 direction from the z2 side surface of the second protruding part 122-2 is positioned within the second support hole 168-2.

As illustrated in FIG. 1, the case 121 of the support member 120 extends both in the z1 direction and in the z2 direction further than the first protruding part 122-1 and the second protruding part 122-2. The connecting part 112 of the bracket 110 forms a space recessed in the z2 direction from the two lever-side fixing plates 163. A part of the case 121 that extends in the z2 direction further than the first protruding part 122-1 is accommodated in the space recessed in the z2 direction that is formed by the connecting part 112.

(Shift Lever)

As illustrated in FIG. 5, the shift lever 130 includes a lever shaft 131 extending in the z direction, a spherical rotation center 132 provided at the z2-side end of the lever shaft 131, and a grip part 133 fixed at the z1-side end of the lever shaft 131. As illustrated in FIG. 1, the rotation center 132 is rotatably supported in the case 121. By holding the grip part 133 to operate the shift lever 130, the operator can rotate the shift lever 130 around the rotation center 132 as the center in a first rotational direction 181 or a second rotational direction 182 illustrated in FIG. 1, and in a third rotational direction 183 or a fourth rotational direction 184 illustrated in FIG. 2. The shift lever device 100 switches the transmission of the vehicle by detecting a movement of the shift lever 130 by a mechanical, electromagnetic, optical or other method.

(Target Member)

The target member 140 illustrated in FIG. 1 is a member fixed to the vehicle. The target member 140 has a first mounting surface 141-1 and a second mounting surface 141-2 (may be referred to as a mounting surface(s) 141 when the distinction is not required), each of which is a plane virtually perpendicular to the ground. As illustrated in FIG. 3, the planar surface on the y2 side of the first vehicle-side fixing plate 161-1 closely contacts the first mounting surface 141-1. The flat surface on the y2-side of the second vehicle-side fixing plate 161-2 closely contacts the second mounting surface 141-2. The fifth bolt 151-5 illustrated in FIG. 3 extends from the y1-side through the first vehicle-side fixing hole 166-1 (FIG. 4) into the target member 140, to fix the first vehicle-side fixing plate 161-1 to the target member 140. The sixth bolt 151-6 illustrated in FIG. 3 extends from the y1-side through the second vehicle-side fixing hole 166-2 (FIG. 4) into the target member 140, to fix the second vehicle-side fixing plate 161-2 to the target member 140

(Summary)

According to the present embodiment, since the connecting plate 162 extends virtually in parallel to both of the direction orthogonal to the vehicle-side fixing plate 161 and the direction orthogonal to the lever-side fixing plate 163, the connecting plate 162 can withstand a greater force than in other cases even if being thinner. In particular, since both of the force orthogonal to the vehicle-side fixing plate 161 and the force orthogonal to the lever-side fixing plate 163 are applied along the connecting plate 162, the connecting plate 162 can withstand a greater force compared with the case where a force is applied to the connecting plate 162 obliquely. Also, since the entire connecting plate 162 is constituted with by a single continuous flat plate, processing is easy. In other words, it is possible to obtain the shift lever mounting bracket 110 that is easy to process, light, and has a high strength.

According to the present embodiment, since the direction orthogonal to the vehicle-side fixing plate 161 and the direction orthogonal to the lever-side fixing plate 163 cross each other, the force orthogonal to the vehicle-side fixing plate 161 and the force orthogonal to the lever-side fixing plate 163 are not directed in the same direction, and thereby, the connecting plate 162 is not easily deformed. Also, even if a force along the lever-side fixing plate 163 is applied to the lever-side fixing plate 163, since it is not likely to act as a force to widen the angle between the connecting plate 162 and the vehicle-side fixing plate 161, it is possible to withstand a greater force compared with a parallel case.

According to the present embodiment, since the vehicle-side fixing plate 161 and the lever-side fixing plate 163 are virtually orthogonal to each other, a force orthogonal to the vehicle-side fixing plate 161 and a force orthogonal to the lever-side fixing plate 163 are virtually orthogonal to each other, and thereby, the connecting plate 162 in particular is not easily deformed. Also, even if a force along the lever-side fixing plate 163 is applied to the lever-side fixing plate 163, since it is not likely to act as a force to widen the angle between the connecting plate 162 and the vehicle-side fixing plate 161, it is possible to withstand a greater force compared with a parallel case.

According to the present embodiment, since one or more connecting parts 112 are provided to connect multiple support parts 111 with multiple support parts 111, the shift lever 130 can be fixed more firmly than in the case where only one support part 111 is provided.

According to the present embodiment, since the two connecting plates 171 connected by the respective connecting bend parts 172 are virtually orthogonal to each other, it is possible to withstand a greater force than in the case where these are not orthogonal to each other, even if being thinner.

According to the present embodiment, the first support part 111-1 and the second support part 111-2 are separated in the x direction (also referred to as the first direction), and at the connecting part 112 that connects the first support part 111-1 with the second support part 111-2, the first connecting plate 171-1 and the second connecting plate 171-2 are connected by one of the connecting bend parts 172 over a range linearly extending in the x direction; therefore, it is possible to withstand a large force applied in the first direction as compared to the other directions. Also, since the vehicle-side fixing plate 161 of the first support part 111-1 and the first connecting plate 171-1 are virtually parallel, the lever-side fixing plate 163 of the first support part 111-1 and the first connecting plate 171-1 are virtually orthogonal to each other, and it is possible to withstand a strong force. Also, since the lever-side fixing plate 163 of the second support part 111-2 and the third connecting plate 171-3 are virtually orthogonal to each other, it is possible to withstand a strong force.

According to the present embodiment, since it is made of metal, the strength is higher than that made of a resin or the like.

According to the present embodiment, the support member 120 can be stably fixed to the vehicle by the shift lever mounting bracket 110 that is easy to process, light, and has a high strength.

According to the present embodiment, since the vehicle-side fixing plate 161 is attached to the mounting surface 141 virtually perpendicular to the ground, the shift lever mounting bracket 110 can be mounted in the lateral direction with respect to the target member 140, and the space in the vehicle can be efficiently used as compared with the case of mounting it on the ground-side surface in the vehicle.

In other examples, the number of support parts 111 may be one, or may be three or more. Two or more connecting parts 112 may be included, and each of the connecting parts 112 may connect two lever-side fixing plates 163 included in the two support parts 111. Although the vehicle-side fixing plate 161 and the lever-side fixing plate 163 are virtually orthogonal to each other, in other examples, the vehicle-side fixing plate 161 and the lever-side fixing plate 163 may extend along a plane where these plates cross each other at an angle other than the right angle. In other examples, the mounting surface 141 may not be perpendicular to the ground.

The present inventive concept is not limited to the present embodiments described above. In other words, those skilled in the art may make various modifications, combinations, sub-combinations, and substitutions within the technical scope in the present disclosure or equivalents thereof, with respect to the elements of the present embodiment described above.

INDUSTRIAL APPLICABILITY

The present disclosure can be applied to a shift lever device to switch a transmission, which may be mounted on a vehicle, a train, an airplane, a ship, a spaceship, or the like.

What is claimed is:

1. A shift lever mounting bracket comprising:
a vehicle-side fixing plate having a flat shape;
a lever-side fixing plate having a flat shape;
a connecting plate having a flat shape, and extending parallel to both a direction orthogonal to the vehicle-side fixing plate and a direction orthogonal to the lever-side fixing plate;
a vehicle-side bend part connecting a part of an edge of the vehicle-side fixing plate with a part of an edge of the connecting plate; and
a lever-side bend part connecting a part of an edge of the lever-side fixing plate and a part of the edge of the connecting plate,
wherein an entirety of the shift lever mounting bracket is constituted with a continuous flat plate,
wherein the shift lever mounting bracket further comprises:
a plurality of support parts; and
one or more connecting parts connecting the plurality of support parts,
wherein each of the plurality of support parts includes one instance of the vehicle-side fixing plate, one instance of the lever-side fixing plate, and one instance of the connecting plate, and
wherein each of the one or more connecting parts connects two instances of the lever-side fixing plates included in two instances of the support parts,
wherein the shift lever mounting bracket further comprises:
a plurality of connecting bend parts,
wherein the connecting part includes a plurality of connecting plates,
wherein a part of the edge of the vehicle-side fixing plate and a part of the edge of the connecting plate are connected by one of the plurality of connecting bend parts, wherein a part of the edge of the connecting plate and a part of the edge of the connecting plate are connected by one of the plurality of connecting bend parts, and
wherein two of the connecting plates connected by said each of the connecting bend parts are orthogonal to each other,
wherein the shift lever mounting bracket further comprises:
a first support part as the support part; and
a second support part as the support part,
wherein the first support part and the second support part are separated from each other in a first direction,
wherein the vehicle-side fixing plate of the first support part and the vehicle-side fixing plate of the second support part are parallel along the first direction,
wherein the lever-side fixing plate of the first support part and the lever-side fixing plate of the second support part are parallel to each other,
wherein the connecting part includes
a first connecting plate as the connecting plate parallel to the vehicle-side fixing plate of the first support part,
a second connecting plate as the connecting plate parallel to the lever-side fixing plate of the first support part, and
a third connecting plate as the connecting plate parallel to the lever-side fixing plate of the second support part in an orthogonal direction,
wherein the vehicle-side fixing plate of the first support part and the first connecting plate are connected by one of the plurality of connecting bend parts,
wherein the first connecting plate and the second connecting plate are connected by one of the plurality of connecting bend parts over a range linearly extending in the first direction,
wherein the second connecting plate and the third connecting plate are connected by one of the plurality of connecting bend parts, and
wherein the third connecting plate and the vehicle-side fixing plate of the second support part are connected by one of the plurality of connecting bend parts.

2. The shift lever mounting bracket as claimed in claim 1, wherein the direction orthogonal to the vehicle-side fixing plate and the direction orthogonal to the lever-side fixing plate cross each other.

3. The shift lever mounting bracket as claimed in claim 2, wherein the vehicle-side fixing plate and the lever-side fixing plate extend along an orthogonal plane.

4. The shift lever mounting bracket as claimed in claim 1, wherein the shift lever mounting bracket is made of metal.

5. A shift lever device comprising:
a shift lever configured to receive an operation performed by an operator so as to switch a transmission of a vehicle according to a movement of the shift lever;
a support part; and
the shift lever mounting bracket as claimed in claim 1,
wherein the support member is fixed to the lever-side fixing plate.

6. The shift lever device as claimed in claim 5, further comprising:
a target member having a mounting surface perpendicular to ground,
wherein the vehicle-side fixing plate is attached to the mounting surface.

* * * * *